United States Patent [19]

Wash et al.

[11] Patent Number: 4,933,780
[45] Date of Patent: Jun. 12, 1990

[54] CAMERA APPARATUS FOR MAGNETICALLY RECORDING ON FILM

[75] Inventors: Michael L. Wash, Pittsford; Christopher T. Mattson, Rochester, both of N.Y.

[73] Assignee: Eastman Kodak Company, Rochester, N.Y.

[21] Appl. No.: 254,903

[22] Filed: Oct. 7, 1988

[51] Int. Cl.<sup>5</sup> .............................................. G11B 5/00
[52] U.S. Cl. ........................................ 360/1; 358/909
[58] Field of Search .................... 361/1, 137; 358/906, 358/969, 269

[56] References Cited

U.S. PATENT DOCUMENTS

| | | |
|---|---|---|
| 4,270,853 | 6/1981 | Hatada et al. ......................... 354/76 |
| 4,270,854 | 6/1981 | Stemme et al. ........................ 354/76 |
| 4,500,183 | 2/1985 | Tanikawa ............................... 354/21 |
| 4,613,911 | 9/1986 | Ohta ......................................... 360/3 |
| 4,689,696 | 8/1987 | Plummer ............................. 358/333 |
| 4,736,215 | 4/1988 | Hudspeth et al. .................... 354/21 |

Primary Examiner—Vincent P. Canney
Attorney, Agent, or Firm—James A. Smith

[57] ABSTRACT

Magnetic recording apparatus for a photographic still camera comprises a magnetic head mounted on a flexure attached to the rear door of the camera. The head is positioned so that when the rear door of the camera is closed, it will enter an opening in the cartridge lip and engage the film. The portion of the lip and the plush material underlying the film provides a complient support for the film.

6 Claims, 7 Drawing Sheets

CAMERA APPARATUS FOR MAGNETICALLY RECORDING ON FILM

CROSS REFERENCE TO RELATED APPLICATIONS

Reference is made to the following commonly assigned copending applications:

1. U.S. Ser. No. 254,906, entitled CAMERA APPARATUS FOR MAGNETICALLY RECORDING ON FILM, and filed Oct. 7, 1988 in the names of Michael L. Wash and Conrad Diehl.
2. U.S. Ser. No. 254,908, entitled CAMERA APPARATUS FOR MAGNETICALLY RECORDING ON FILM, and filed Oct. 7, 1988 in the names of Daniel M. Pagano and Robert P. Cloutier.
3. U.S. Ser. No. 254,914, entitled CAMERA APPARATUS FOR MAGNETICALLY RECORDING ON FILM, and filed Oct. 7, 1988 in the name of Richard R. Kelbe.
4. U.S. Ser. No. 255,693, entitled FILM INFORMATION EXCHANGE SYSTEM USING DEDICATED MAGNETIC TRACKS ON FILM and filed Oct. 7, 1988 in the name of Robert P. Cloutier et al.
5. U.S. Ser. No. 221,955, entitled MOTOR-DRIVEN FILM TRANSPORT APPARATUS, and filed July 20, 1988 in the name of Donald M. Harvey. U.S. Ser. No. 221,955 is incorporated into this application by reference.
6. U.S. Ser. No. 206,407, entitled, as amended, THREE PART DECODER CIRCUIT, and filed June 14, 1988 in the name of Michael L. Wash.
7. U.S. Ser. No. 206,408, entitled, as amended, THREE PART ENCODER CIRCUIT, and filed June 14, 1988 in the names of Arthur Whitfield and Michael L. Wash.
8. U.S. Ser. No. 206,553, entitled, as amended, THREE PART DECODER CIRCUIT, and filed June 14, 1988 in the name of Arthur Whitfield.
9. U.S. Ser. No. 206,646, entitled METHOD FOR MODULATING A BINARY DATA STREAM, and filed June 14, 1988 in the name of Michael L. Wash.
10. U.S. Ser. No. 254,907, entitled CAMERA APPARATUS FOR PREVENTING DOUBLE EXPOSURE and filed Oct. 7, 1988 in the name of James W. Cannon.

BACKGROUND OF THE INVENTION

This invention relates to magnetic recording apparatus for cameras and more particularly, to magnetic recording apparatus for photographic still cameras.

In commonly assigned copending application Ser. No. 255,693 entitled FILM INFORMATION EXCHANGE SYSTEM USING DEDICATED MAGNETIC TRACKS ON FILM, and filed Oct. 7, 1988 in the name of Robert P. Cloutier there is disclosed a photographic film having a virtually transparent magnetic coating covering the non-emulsion side of the film and dedicated recording areas on the coating for recording information such as film type, film speed, film exposure information and information relevant to the processing and subsequent use (e.g. printing) of the film. The system thus provides for recording of information during film manufacture, reading and/or recording of information during camera use, and reading and/or recording of printed related information during photofinishing. In the aforementioned copending application it is specifically proposed that camera information be recorded in spaced tracks preferably outside the image area along the edge of the film.

Reading and writing information on a magnetic coating or stripe on photographic film in a still camera requires solutions to problems different than those encountered in other apparatus. Perhaps the most significant problem is the space limitations in a portable hand held still camera which necessarily must be as compact and light as possible to appeal to the average consumer. Perhaps equally significant, however, is the characteristics of photographic film relative to more common recording mediums such as magnetic tape. Because photographic films are stiffer then magnetic tape and have varying degrees of curl both in the longitudinal and tranverse direction depending upon the base materials and number and nature of sensitizing layers and environmental conditions, they present unusual problems in reading and writing information on a magnetic coating or stripe. To provide a reliable read or write signal the magnetic head must remain in close proximity to the magnetic coating. Any disturbances such as variations in film curl can vary the relationship of the head to the coating and decrease the reliability of the signal.

Another problem unique to compact photographic still cameras is that film advance occurs in a short period of time with a limited amount of motion and does not allow the steady state conditions normally associated with magnetic recording. Recording and playback must take place during transient conditions which tend to separate the film from the recording head. For optimum magnetic recording during these conditions, the magnetic head must maintain contact (i.e. within 10 micro-inches) with the magnetic coating.

Techniques for maintaining the desired relationship of the head to a magnetic coating in other apparatus, are not practical for use in a photographic still camera particularly a compact 35 mm camera. For example, in a sound movie camera, a film having a magnetic stripe along one edge is typically moved over a drum and information is recorded by a magnetic head positioned in close proximity to the drum. The drum provides a rigid support for the film, removes film curl and assures a uniform head to film relationship. While a fixed support such as a sound drum produces satisfactory results, the space limitations in a photographic still camera render it impractical. Also, it is not suitable for the transient conditions described above.

Also, in a still camera system, it is desirable to record information pertinent to and coincident with images because negatives are cut up in photofinishing. In sound movie cameras, recorded information is displaced from the image to achieve continuous motion of the film during recording as compared with intermittent motion during exposure.

The prior art relating to recording on photographic film thus generally teaches providing a support for the recording medium on the side opposite from the recording head and continuous motion of the recording medium to ensure reliable recording.

SUMMARY OF THE INVENTION

In accordance with the invention, magnetic recording on a photographic still camera is achieved in a simple, reliable manner by providing an opening in a film cartridge lip in which a magnetic head is received. Portions of the lip and light sealing material within the lip provide a compliant support for the head and control for transient film curl to insure reliable magnetic coupling between the head and magnetic surface of the film.

BRIEF DESCRIPTION OF THE DRAWINGS

Other advantages of the invention will become apparent from the following description taken in connection with the accompanying drawings wherein.

DETAILED DESCRIPTION OF THE INVENTION

Figure 1:
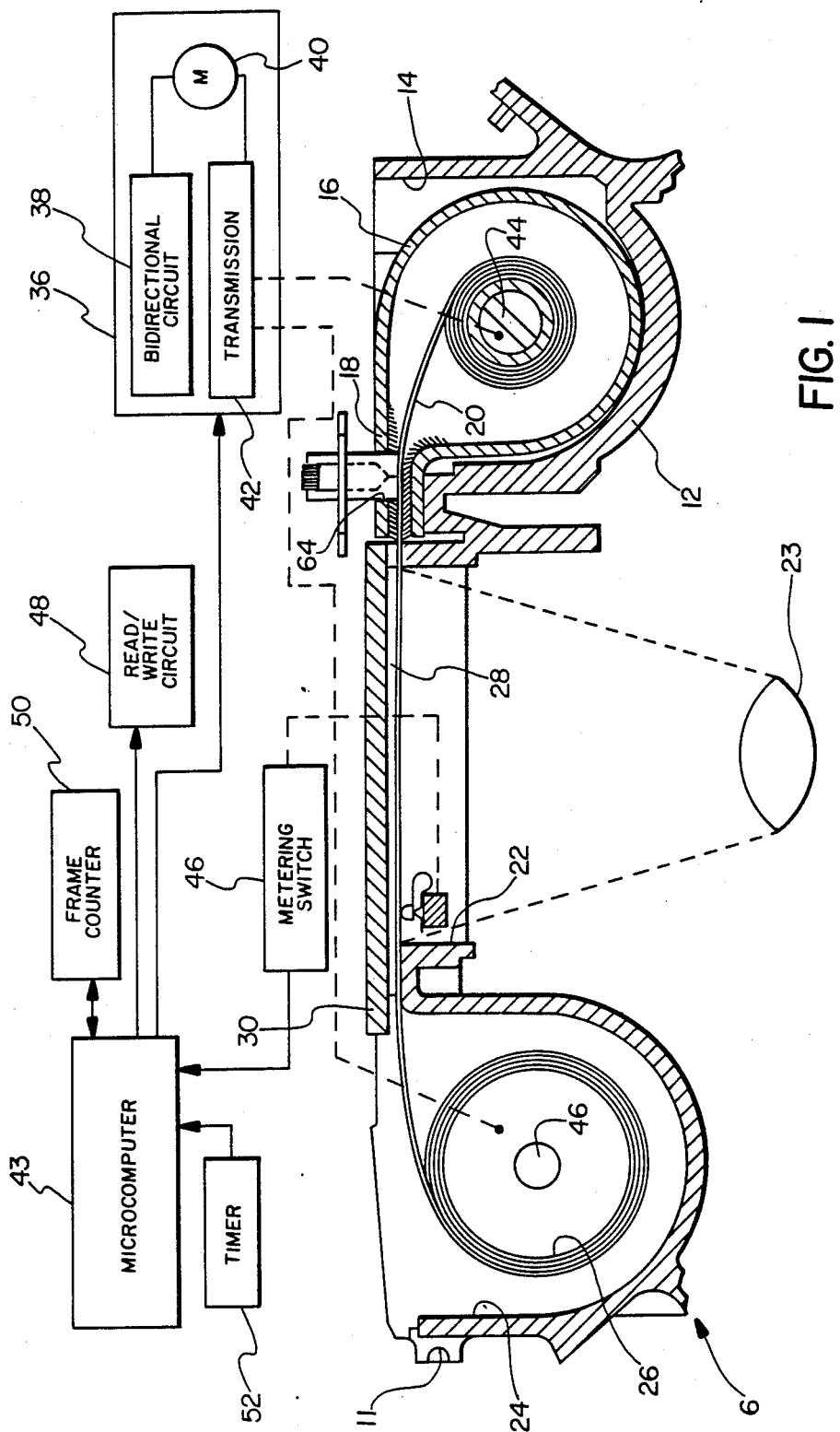
FIG. 1 is a cross section of a portion of a conventional photographic still camera illustrating a magnetic recording apparatus in accordance with the invention.
Figure 2:
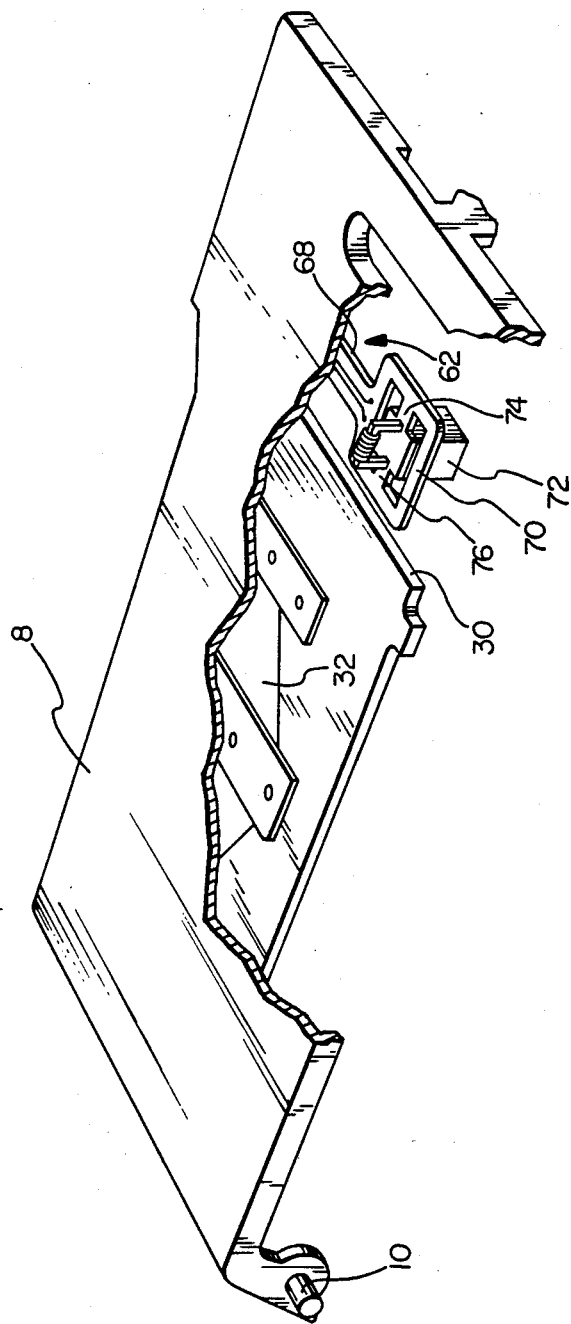
FIG. 2 is a perspective view of the back or door for the camera illustrated in FIG. 1.
Figure 3:
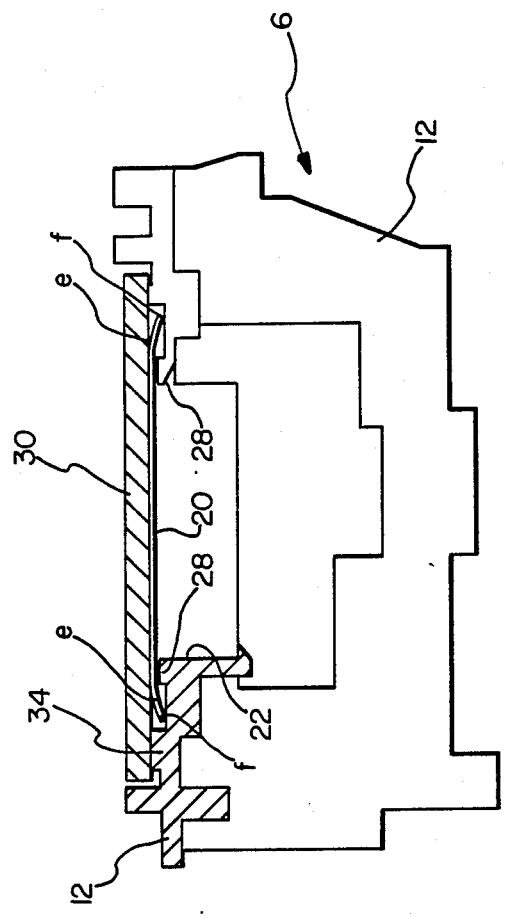
FIG. 3 is a cross section taken perpendicular to the section shown in FIG. 1.

Referring to FIGS. 1, 2 and 3 of the drawings, there is shown a portion of a typical photographic still camera 6 having a back or rear door 8 (FIG. 2) pivotal to an open position by means of a pair of pins 10 one of which is shown in FIG. 2. The pins 10 are received in holes 11 in frame 12. Since such cameras are well known in the art, features not necessary for an understanding of the present invention have been omitted or shown in block diagram to simplify the disclosure.

The camera 6 comprises a frame or housing 12 having a chamber 14 at one end thereof for receiving a film cartridge 16. The cartridge 16 which is shown more clearly in FIGS. 4 and 5, preferably takes the form of the film cartridge disclosed in the referenced copending application U.S. Ser. No. 221,955 having a lip 18 from which a film 20 is removed for exposure. The film 20 is provided with a transparent magnetic coating 21 on its non-emulsion side, a single row of perforations (p) along one edge and dedicated longitudinal recording areas (r) along the edges outside the image area (i). As disclosed in copending application Ser. No. 255,693, filed Oct. 7, 1988 in the name of Robert P. Cloutier et al. and entitled FILM INFORMATION EXCHANGE SYSTEM USING DEDICATED MAGNETIC TRACKS ON FILM, the area (r) would be dedicated areas for recording information in the camera, the image area being dedicated to the recording of photofinishing information.

It will be apparent, however, that the recording apparatus disclosed herein is equally applicable to magnetic coatings or stripes on conventional 35 mm film, and that the camera apparatus disclosed herein can alternatively be a conventional 35 mm camera such as the commercially available KODAK K-14 Medalist VR 35 camera.

Figure 4:
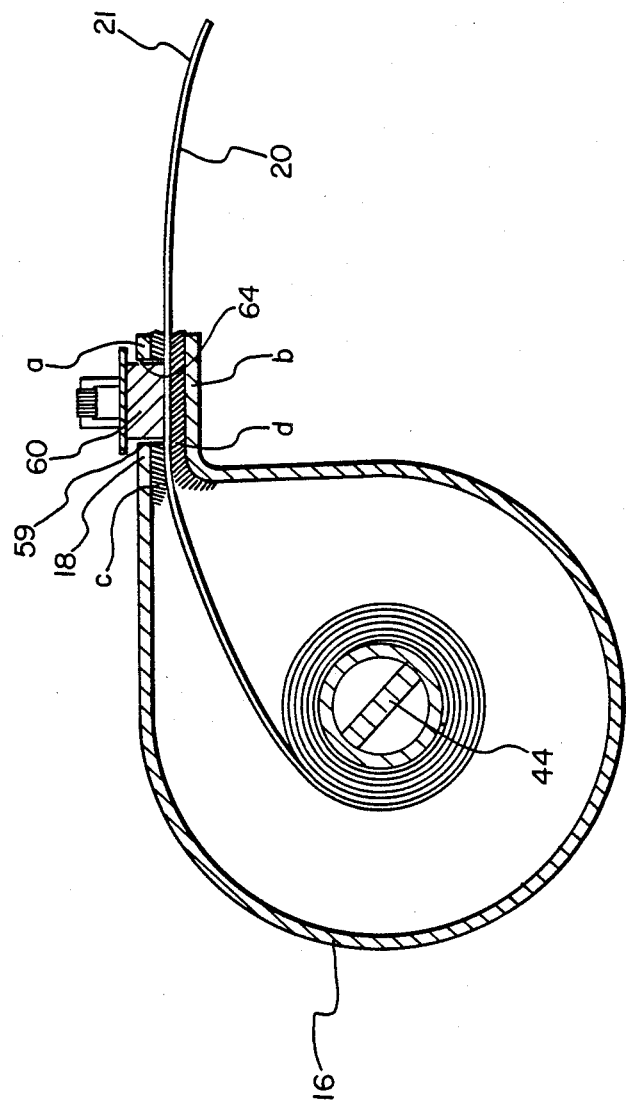
FIG. 4 is an enlarged cross section of the film cartridge shown in FIG. 1 illustrating the head mounting.

As shown in FIG. 4, the lip 18 comprises upper and lower spaced flanges (a) and (b) which serve to clamp upper and lower pieces of plush material (c) and (d) to opposite sides of the film.

As is well known in the art, the surfaces of cartridge 16 and lip 18 engage complimental surfaces of the chamber 14 and the camera back whereby when the camera back is closed, the cartridge is fixedly held in the orientation shown in FIG. 1. Since such camera and cartridge interface features are well known in the art, further description is deemed unnecessary.

From the lip 18, the film 20 is transported across a rectangular exposure opening 22 aligned with a taking lens 23 to a film take-up chamber 24 where it is wound on a take-up spool 26. Mechanisms for accomplishing such film transport are well known in the art. Typically, they operate to advance the film frame by frame from the cartridge to the take-up spool, or if the camera exposes during rewind, frame by frame from the take-up spool to the cartridge.

A pair of film rails 28 are formed on opposite sides of the rectangular exposure opening 22 to engage the longitudinal edges of the film. The film 20 is urged toward the rails 28 by a platen 30 mounted on a leaf spring 32 on the camera back 8. The platen 30 comprises a flat rectangular plate having planar dimensions complimental to the rectangular exposure opening 22 whereby upon closure of the back, platen 30 will engage platen support surfaces 34, engage the film 20 and urge it with slight pressure toward rails 28 under the influence of spring 32 as shown more clearly in FIG. 3. The platen 30 will tend to remove longitudinal curl resulting from film core set in the cartridge 16 and some of the transverse curl across the film. However, since the film is unsupported transversely on its emulsion side, some transverse curl still exists during film exposure as indicated in FIG. 3 at areas (e) but not enough to noticeably degrade the image.

In a typical still camera, the spacing between the platen 20 and the rails 28 is in the range of 0.25–0.45 mm as a result of manufacturing tolerances. The photographic film used in such a camera is typically 0.15 mm thick. Accordingly, as shown in FIG. 3, the film may not actually engage the rails. Due to the transverse film curl, the extreme edges of the film may actually engage the camera surfaces (f) on the other side of the rails with the curl bias causing most of the width of the film to engage the platen. Because of this result, the camera lens is typically focused on a film plane next to the platen.

FIG. 1 also depicts in a block diagram some of the more basic central features of cameras of the type described. Typically, a motorized film transport means 36 comprising a conventional bi-directional circuit 38 for reversing a drive motor 40, a drive transmission 42 and drive hubs 44 and 46 which engage the core of film cartridge 16 and the take-up spool 26 respectively, is provided for rotating the spool core and the take-up spool either in the unwinding or winding directions under the control of a micro computer 43.

Other elements of the camera include a conventional metering switch 46, a read/write circuit 48, a shutter release mechanism, a conventional digital frame counter 50 and a conventional timer 52. These components are all controlled from the micro computer 43 in a manner well known in the art and since they form no part of the present invention, further description is deemed unnecessary.

As mentioned above, magnetic recording in photographic still cameras involves unique problems. Film advance occurs in a short period of time with a limited amount of motion and does not allow the steady conditions normally associated with magnetic recording to be achieved. In view of these problems, the read/write circuit 48 preferably utilizes the encoding and decoding techniques disclosed in the referenced commonly assigned copending applications U.S. Ser. Nos. 206,407, 206,408 and 206,553, and the code format preferably takes the form of that disclosed in the referenced copending application Ser. No. 206,646.

Figure 6A:
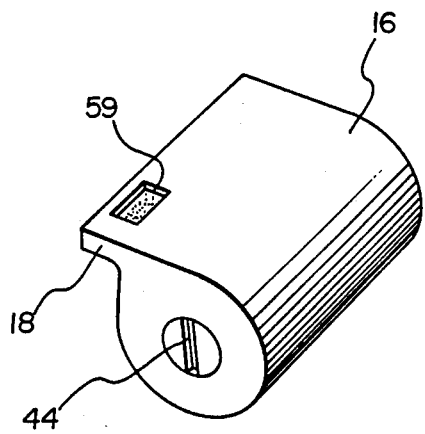
FIGS. 6A and 6B are perspective views showing cartridge variations.

In accordance with the invention, the cartridge lip 18 is provided with a rectangular opening 59 in its upper flange (a) and the upper plush material (c) as illustrated most clearly in FIGS. 4 and 6A. A conventional magnetic read/write head 60 connected to the read/write circuit 48 is mounted on an elongated flexure 62 having a flange 63 attached at one end to the camera back 8 by, for example, cement. The head 60 extends through an opening 64 in the upper flange (a) and upper plush material (c) of lip 18 and is positioned so that when the camera back is closed as shown in FIG. 1, the head will engage the transparent magnetic coating of the film in the opening 64. The position of head 60 in the flexure 62 is adjusted so that when the camera back is closed the head will maintain slight contact (i.e. within 10 microinches) with the magnetic coating of film 20 with a bias force in the range of 14–56 grams. While the flexure is disclosed as being mounted on the camera back, it will be obvious that it could be mounted on any movable part which engages the cartridge when it is loaded.

The lip 18 is sized and opening 64 in the upper lip (a) and upper plush material (c) is preferably located such that adequate plush material (c) remains on the supply chamber side of the opening to provide an adequate light seal as shown most clearly in FIG. 4. Also, it will be apparent that the opening 64 can be merely a rectangular recess extending to the end of the lip.

Figure 5:
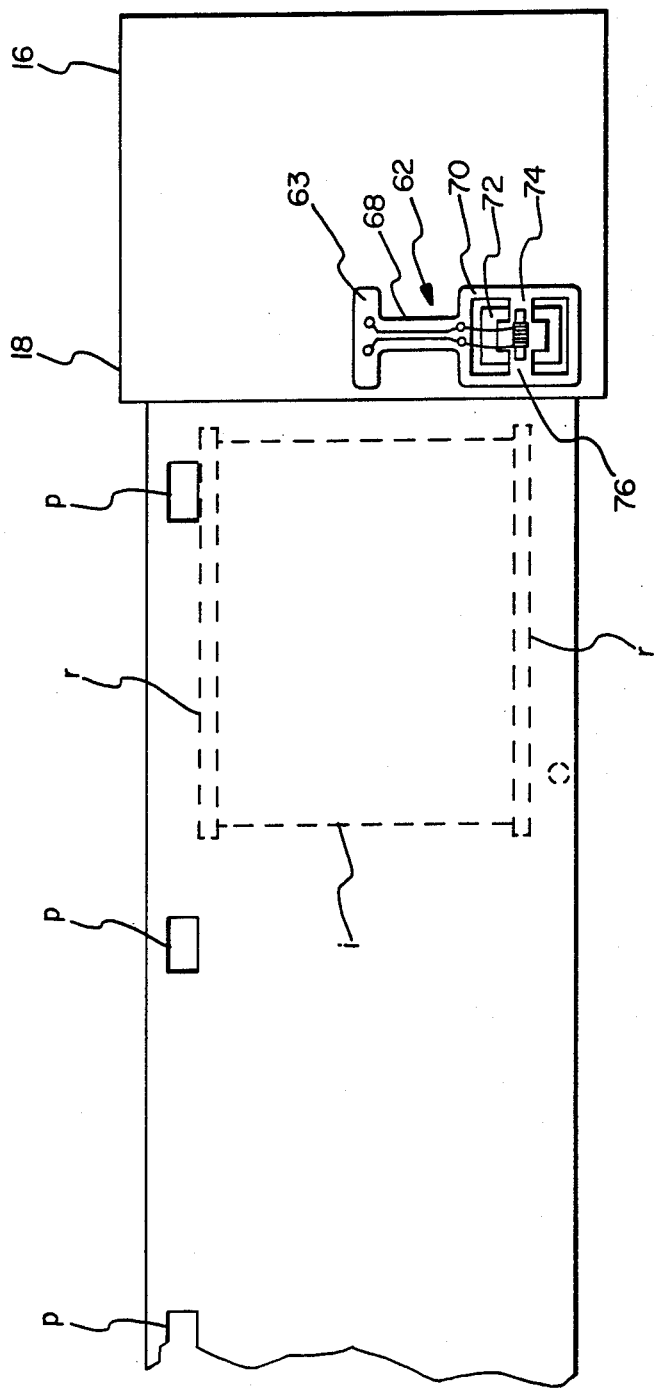
FIG. 5 is an enlarged top view of the film cartridge shown in FIG. 1 with the film partially withdrawn.

Referring specifically to FIG. 5, the flexure comprises a flexure arm 68 extending from the flange 63 along an axis perpendicular to the longitudinal film axis. The arm 68 carries at its movable end an integral rectangular flexure frame 70 which is connected to a head support 72 by two inwardly extending transverse flexures 74 and 76.

Figure 9:
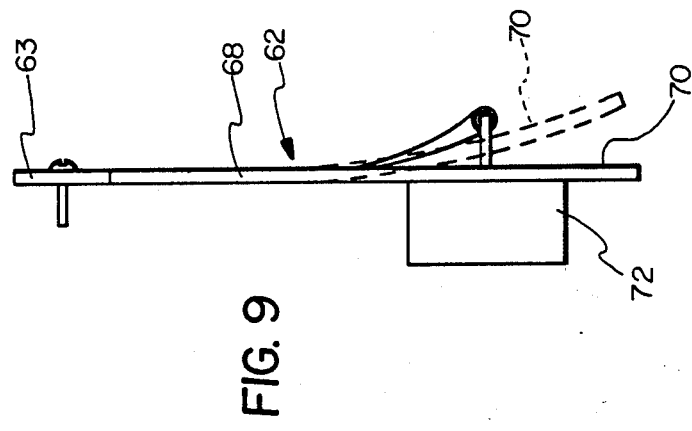
FIG. 9 is a side view of the apparatus shown in FIG. 7.

The arm 68 functions as a torsion system to permit tilting or roll of the assembly comprising head 60 and support 72 transversely of the longitudinal film axis to accommodate variations in transverse film curl described above. The flexures 74 and 76 form a second independent torsion system to permit tilting or pitching of the assembly comprising support 72 and head 60 in the longitudinal direction of the film to accommodate any disturbances in the longitudinal direction. The arm 68 will allow displacement of the head 60 in a vertical direction substantially perpendicular to the film as shown in FIG. 9 by the solid and dashed position of the flexure. The flexure 62 thus allows freedom of movement of the head 60 and its support 72 on three axis (roll, pitch and elevation). The pitch axis is the axis of flexure arms 74 and 76 and the roll axis is the longitudinal axis of flexure arm 68. The elevation axis is the axis of head 60.

The flexure 62 is somewhat similar in configuration to the twin arm flexures employed in floppy disc recorders. However, to accommodate the more extreme disturbances encountered with photographic film, the single flexure arm 68 is provided with more flexibility for permitting greater accommodation to roll and elevational movement. Flexures 74 and 76 are also relatively more flexible to retain the head in contact with the film during variations in longitudinal curl. Thus, the flexure has novel characteristics which enable it to accommodate the disturbances in a photographic film environment.

In operation, the lower flange (b) and the lower plush material (d) provide a complient support for the film 20, the plush material providing the compliance and the flange (b) providing the support. This structure effectively provides a head to film interface outside of the image area of the camera in a space where the film is supported. Because existing cartridge parts are used to support the film, the magnetic recording apparatus utilizes little space within the camera.

Figure 6B:
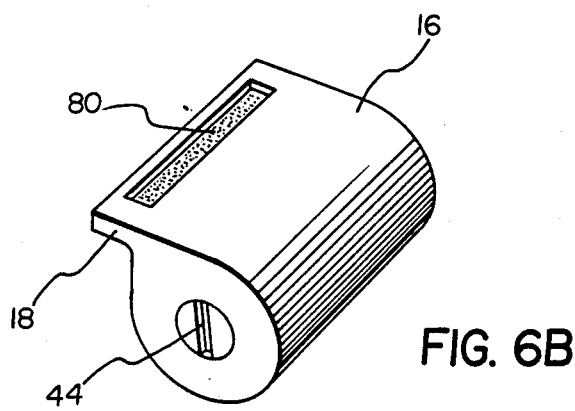
Figure 7:
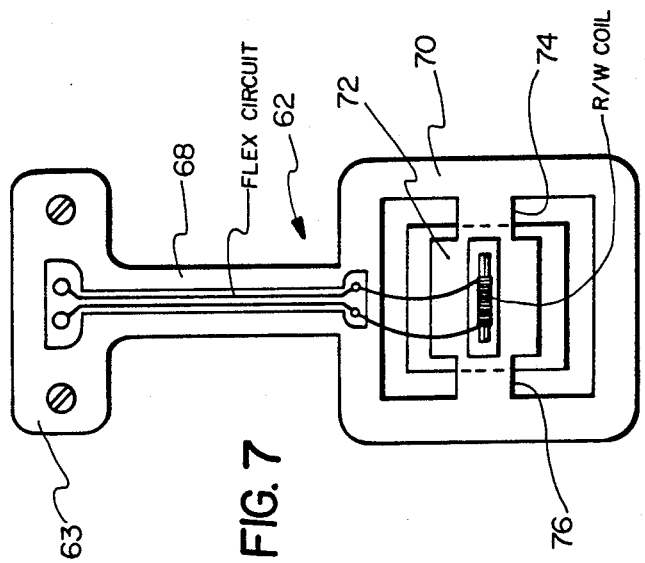
FIG. 7 is an enlarged top view of the head and flexure assembly.
Figure 8:
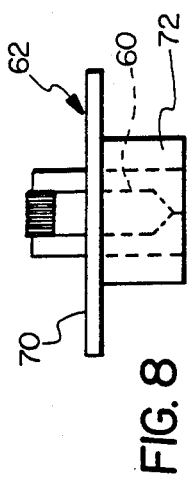
FIG. 8 is an end view of the apparatus shown in FIG. 7.

FIG. 6B illustrates an additional embodiment of the cartridge for use with multiple heads. In this embodiment, the cartridge 16 is provided with an elongated opening 80 adapted to receive a plurality of heads each mounted in the same manner as head 60 or mounted on a single flexure of the type illustrated in FIG. 7. Alternatively, the cartridge 16 could be provided with multiple openings for multiple heads respectively.

To calibrate the system, the vertical position or elevation of the head 60 is initially adjusted in support 72 to establish a high head contact force on the film. This force is then reduced through adjustment of the head elevation until it has minimum contact force on the film to produce reliable recording and good playback. The other two degrees of freedom (pitch and roll) are relied on to maintain contact of the head with the film during film transport.

The disclosed embodiment of the invention achieves magnetic recording on conventional photographic film in a still camera by uniquely utilizing camera and cartridge parts. Since the only additional parts that need be added to a conventional camera to achieve magnetic recording comprise a magnetic head and flexure, the system possesses significant advantages from a cost standpoint. By mounting the head on the camera back and using the cartridge parts as a head support on the other side of the film from the head, the size of the camera is not increased. Thus the invention has significant advantages.

Another significant advantage of the flexural mounting of the recording head is that the inherent compliance permits the magnetic head to adjust to small transient disturbances and thus maintain the required head to film contact.

While the invention has been shown and described with reference to a preferred embodiment thereof, it will be apparent that various changes may be made without departing from the scope of the invention as defined by the appended claims.

I claim:

1. A photographic still camera for receiving a film cartridge, the cartridge having a lip for exiting film from the cartridge, said camera comprising:
   a magnetic head for engaging film within the cartridge lip; and
   means for supporting said head.

2. A photographic still camera as claimed in claim 1 wherein the cartridge has an opening in its lip and said magnetic head is received by said opening.

3. A photographic still camera as claimed in claim 2 wherein said head supporting means comprises a flexure.

4. A photographic still camera as claimed in claim 3 wherein said flexure supports said head for roll movement in a direction transverse to the longitudinal axis of the film, pitching movement in a direction parallel to the longitudinal axis of the film and elevational movement substantially perpendicular to the film.

5. A photographic still camera as claimed in claim 4 further including a rear door on said camera, said flexure having one end attached to said rear door and its other end carrying said magnetic head.

6. A photographic film cartridge for use in a photographic still camera having a magnetic head for recording information on the film:
  said cartridge comprising a container;
  a lip on said container having an opening for exiting film from said container; and
  a second opening in said lip for receiving the magnetic head to permit said magnetic head to read and/or record information on the film within said lip.

* * * * *